US008323531B2

(12) United States Patent
Yoshida et al.

(10) Patent No.: US 8,323,531 B2
(45) Date of Patent: Dec. 4, 2012

(54) METHOD FOR PRODUCING CONDUCTIVE POLYMER SOLUTION

(75) Inventors: Kazuyoshi Yoshida, Kazo (JP); Sou Matsubayashi, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 312 days.

(21) Appl. No.: 12/848,452

(22) Filed: Aug. 2, 2010

(65) Prior Publication Data

US 2010/0294997 A1 Nov. 25, 2010

(30) Foreign Application Priority Data

Aug. 3, 2009 (JP) ............................... P2009-180581

(51) Int. Cl.
*H01B 1/00* (2006.01)
*C08G 75/00* (2006.01)
*C08G 73/06* (2006.01)

(52) U.S. Cl. ......... 252/500; 528/373; 528/422; 528/423

(58) Field of Classification Search .................. 252/500; 528/377, 422, 423
See application file for complete search history.

(56) References Cited

U.S. PATENT DOCUMENTS

2002/0016440 A1 * 2/2002 Louwet et al. ................ 528/373
2004/0051084 A1 * 3/2004 Wessling et al. .............. 252/500
2008/0017833 A1 * 1/2008 Louwet et al. ................ 252/500
2009/0294735 A1 * 12/2009 Yoshida et al. ............... 252/500

FOREIGN PATENT DOCUMENTS

EP 2105458 * 9/2009
JP 2636968 8/1997
JP 2004-532292 10/2004
JP 2006-249303 9/2006
JP 2008-045116 2/2008
JP 2008-115215 5/2008
WO WO 02/067273 8/2002

* cited by examiner

*Primary Examiner* — Mark Kopec
*Assistant Examiner* — Jaison Thomas
(74) *Attorney, Agent, or Firm* — Ostrolenk Faber LLP

(57) ABSTRACT

There is provided a method for producing a conductive polymer solution comprising: a freeze-drying step in which an aqueous conductive polymer solution containing a complex that includes a π-conjugated conductive polymer and a polyanion is freeze dried to thereby obtain a solid complex; and a dispersion step in which an organic solvent having a water content of 4% by mass or less and an amine compound are mixed to the solid complex, followed by a dispersion treatment.

17 Claims, No Drawings

METHOD FOR PRODUCING CONDUCTIVE POLYMER SOLUTION

BACKGROUND OF THE INVENTION

1. Field of the Invention

The present invention relates to a method for producing a non-aqueous conductive polymer solution containing a π-conjugated conductive polymer.

The present application claims priority from Japanese Patent Application No. 2009-180581, filed on Aug. 3, 2009, the contents of which are hereby incorporated by reference into this application.

2. Description of the Related Art

An aqueous conductive polymer solution formed by dissolving π-conjugated conductive polymer such as polythiophene in water is often used as a coating material for forming a conductive coating film.

In Patent Document 1, a method has been proposed as a method for producing an aqueous conductive polymer solution, in which 3,4-dialkoxythiophene is polymerized by chemical oxidation to produce an aqueous poly(3,4-dialkoxythiophene) solution using an oxidizing agent in the presence of polystyrene sulfonic acid.

Incidentally, it requires a long drying time when forming a conductive coating film by applying an aqueous conductive polymer solution as described above, which makes the productivity of the conductive coating film low.

In order to shorten the drying time, a conductive polymer solution in which water serving as a solvent in the aqueous conductive polymer solution has been substituted with an organic solvent may be used.

As a method for producing a conductive polymer solution, a method has been disclosed in Patent Document 2, in which an organic solvent is added to an aqueous conductive polymer solution, followed by water removal by volatilization using an evaporator.

In addition, a method has been disclosed in Patent Document 3, in which a phase transfer catalyst is added to an aqueous conductive polymer solution to precipitate a mixture containing π-conjugated conductive polymer, a solubilizing polymer and the phase transfer catalyst, followed by the addition of an organic solvent to this mixture.

In Patent Document 4, a method has been disclosed, in which an amine compound is added to an aqueous conductive polymer solution, and the aqueous conductive polymer solution is then concentrated by ultrafiltration, followed by the addition of an organic solvent thereto.

In Patent Document 5, a method in which a conductive polymer solution is spray dried, followed by the addition of an organic solvent, an amine compound and a nonionic surfactant to the resulting solid matter, and a method in which a precipitant and an organic solvent are added to an aqueous conductive polymer solution, and an amine compound and a nonionic surfactant are then added thereto following water removal have been disclosed.

PRIOR-ART DOCUMENT

Patent Document

[Patent Document 1] Japanese Patent Publication No. 2636968

[Patent Document 2] PCT International Publication No. WO2004-532292

[Patent Document 3] Japanese Unexamined Patent Application, First Publication No. 2006-249303

[Patent Document 4] Japanese Unexamined Patent Application, First Publication No. 2008-115215

[Patent Document 5] Japanese Unexamined Patent Application, First Publication No. 2008-45116

However, in the method disclosed in Patent Document 2, it is necessary to use an organic solvent having a boiling point considerably higher than that of water and which can be mixed with water, and thus there are only a limited number of options available for the organic solvent.

In the method disclosed in Patent Document 3, an extraction step is required, which tends to make the process complicated.

In the method disclosed in Patent Document 4, it has been difficult to uniformly include a complex containing a π-conjugated conductive polymer and a polyanion in an organic solvent. In addition, clogging of the ultrafiltration membrane occurs when repeating the ultrafiltration process, and thus maintenance of the ultrafiltration membrane has been needed on a regular basis. Therefore, the operation tended to become complicated.

In the method disclosed in Patent Document 5 which involves spray drying, depending on the spraying condition or drying condition, the redissolution in an organic solvent became difficult at times. In addition, in a method where precipitation is conducted using a precipitant, since a large amount of water remains, the residual water content in the conductive polymer solution is also large, which makes it difficult to mix a binder resin therewith.

Accordingly, an object of the present invention is to provide a method for producing a conductive polymer solution, in which a wide variety of organic solvents can be used, a complex including a π-conjugated conductive polymer and a polyanion can be readily dissolved in an organic solvent, and the water content in the obtained conductive polymer solution can be reduced.

SUMMARY OF THE INVENTION

[1] A method for producing a conductive polymer solution characterized by including a freeze-drying step in which an aqueous conductive polymer solution containing a complex that includes a π-conjugated conductive polymer and a polyanion is freeze dried to thereby obtain a solid complex; and a dispersion step in which an organic solvent having a water content of 4% by mass or less and an amine compound are added in the solid complex, followed by a dispersion treatment.

[2] The method for producing a conductive polymer solution according to the above aspect [1], characterized by further including a step of mixing a binder resin which dissolves in an amount of 1 g or less in 100 g of water.

[3] The method for producing a conductive polymer solution according to the above aspect [1] or [2] characterized in that a water content of the solid complex is adjusted to within a range from 3 to 50% by mass in the freeze-drying step.

[4] The method for producing a conductive polymer solution according to any one of the above aspects [1] to [3] characterized in that a specific surface area of the solid complex is adjusted to within a range from 5 to 200 $m^2/g$ in the freeze-drying step.

[5] The method for producing a conductive polymer solution according to any one of the above aspects [1] to [4] characterized in that the dispersion treatment is conducted so that a cumulant average particle size of the complex is 2,000 nm or less in the dispersion step.

[6] The method for producing a conductive polymer solution according to any one of the above aspects [1] to [5]

characterized in that the aqueous conductive polymer solution includes at least one conductivity improver selected from the following compounds (a) to (h):

(a) a nitrogen-containing aromatic heterocyclic compound;

(b) a compound containing two or more hydroxy groups;

(c) a compound containing two or more carboxy groups;

(d) a compound containing one or more hydroxy groups and one or more carboxy groups;

(e) a compound containing an amide group;

(f) a compound containing an imide group;

(g) a lactam compound; and (h) a compound containing a glycidyl group.

In the method for producing a conductive polymer solution according to the present invention, a wide variety of organic solvents can be used, a complex including a π-conjugated conductive polymer and a polyanion can be readily dissolved in an organic solvent, and the water content in the obtained conductive polymer solution can be reduced.

DETAILED DESCRIPTION OF THE INVENTION

<Method for Producing Conductive Polymer Solution>

The method for producing a conductive polymer solution according to the present invention is a method to obtain a solution of a conductive polymer dissolved in an organic solvent from an aqueous conductive polymer solution, and is a method that includes a freeze-drying step and a dispersion step, thereby obtaining a conductive polymer solution containing a π-conjugated conductive polymer, a polyanion, an amine compound and an organic solvent.

(Aqueous Conductive Polymer Solution)

An aqueous conductive polymer solution used in the production method of the present invention contains a complex constituted of a π-conjugated conductive polymer and a polyanion, and water.

[π-Conjugated Conductive Polymer]

The π-conjugated conductive polymer can use any organic polymer in which the main chain is composed of a π-conjugated system. Examples include polypyrroles, polythiophenes, polyacetylenes, polyphenylenes, polyphenylenevinylenes, polyanilines, polyacenes, polythiophenevinylenes, and copolymers thereof. In terms of the ease of polymerization, and the stability of the polymer in air, polypyrroles, polythiophenes and polyanilines are preferred.

The π-conjugated conductive polymer is able to provide adequate conductivity and the compatibility with binders even in an unsubstituted form, but in order to further enhance the conductivity and the dispersibility within, and compatibility with binders, it is preferable that functional groups such as alkyl groups, carboxy groups, sulfo groups, alkoxy groups, hydroxy groups and cyano groups are introduced into the π-conjugated conductive polymer.

Specific examples of this type of π-conjugated conductive polymers include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polythiophene, poly(-methylthiophene), poly(-ethylthiophene), poly(3-propylthiophene), poly(3-butylthiophene), poly(3-hexylthiophene), poly(3-heptylthiophene), poly(-octylthiophene), poly(3-decylthiophene), poly(3-dodecylthiophene), poly(3-octadecylthiophene), poly(3-bromothiophene), poly(-chlorothiophene), poly(3-iodothiophene), poly(-cyanothiophene), poly(-phenylthiophene), poly(3,4-dimethylthiophene), poly(3,4-dibutylthiophene), poly(3-hydroxythiophene), poly(3-methoxythiophene), poly(-ethoxythiophene), poly(3-butoxythiophene), poly(3-hexyloxythiophene), poly(-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(-anilinesulfonic acid).

Of these, a (co)polymer composed of either one or two compounds selected from polypyrrole, polythiophene, poly(N-methylpyrrole), poly(3-methylthiophene), poly(3-methoxythiophene) and poly(3,4-ethylenedioxythiophene) can be used particularly favorably in terms of the resistance and the reactivity. Moreover, polypyrrole and poly(3,4-ethylenedioxythiophene) yield a greater increase in conductivity and also offer improved heat resistance, and are therefore particularly desirable.

[Polyanion]

Examples of polyanions include substituted or unsubstituted polyalkylenes, substituted or unsubstituted polyalkenylenes, substituted or unsubstituted polyimides, substituted or unsubstituted polyamides and substituted or unsubstituted polyesters, and the polymers may be composed solely of structural units having an anion group or may be composed of structural units having an anion group and structural units having no anion group.

The term "polyalkylene" describes a polymer in which the main chain is composed of repeating methylene units.

A "polyalkenylene" is a polymer composed of structural units having one unsaturated bond (vinyl group) within the main chain.

Examples of the polyimides include polyimides formed from an acid anhydride such as pyromellitic dianhydride, biphenyl tetracarboxylic dianhydride, benzophenone tetracarboxylic dianhydride or 2,2'-[4,4'-di(dicarboxyphenyloxy)phenyl]propane dianhydride, and a diamine such as oxydiamine, para-phenylenediamine, meta-phenylenediamine or benzophenonediamine.

Examples of the polyamides include polyamide 6, polyamide 6,6 and polyamide 6,10.

Examples of the polyesters include polyethylene terephthalate and polybutylene terephthalate.

In those cases where the polyanion includes a substituent, examples of the substituent include an alkyl group, a hydroxy group, an amino group, a carboxy group, a cyano group, a phenyl group, a phenol group, an ester group and an alkoxy group. Considering factors such as the solubility of the polyanion in organic solvents, the heat resistance, and the compatibility of the polyanion with resins, alkyl groups, hydroxy groups, phenol groups and ester groups are preferred.

Examples of the alkyl groups include chain-like alkyl groups such as methyl, ethyl, propyl, butyl, isobutyl, t-butyl, pentyl, hexyl, octyl, decyl and dodecyl groups, and cycloalkyl groups such as cyclopropyl, cyclopentyl and cyclohexyl groups.

Examples of the hydroxy groups include hydroxy groups bonded directly to the main chain of the polyanion, and hydroxy groups bonded to the main chain via other functional groups. The hydroxy groups may be substituted at either the terminal of these functional groups, or at non-terminal positions within the functional groups.

Examples of the amino groups include amino groups bonded directly to the main chain of the polyanion, and amino groups bonded to the main chain via other functional groups. Examples of these other functional groups include alkyl groups of 1 to 7 carbon atoms, alkenyl groups of 2 to 7 carbon atoms, amide groups and imide groups and the like. The amino groups may be substituted at either the terminal of these functional groups, or at non-terminal positions within the functional groups.

Examples of the phenol groups include phenol groups bonded directly to the main chain of the polyanion, and phenol groups bonded to the main chain via other functional groups. Examples of these other functional groups include alkyl groups of 1 to 7 carbon atoms, alkenyl groups of 2 to 7 carbon atoms, amide groups and imide groups and the like. The phenol groups may be substituted at either the terminal of these functional groups, or at non-terminal positions within the functional groups.

Examples of the polyalkylenes having a substituent include polyethylene, polypropylene, polybutene, polypentene, polyhexene, polyvinyl alcohol, polyvinylphenol, poly(3,3,3-trifluoropropylene), polyacrylonitrile, polyacrylate and polystyrene.

Specific examples of the polyalkenylene include polymers containing at least one structural unit selected from the group consisting of: propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2-ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-octyl-2-butenylene, 3-decyl-2-butenylene, 3-dodecyl-2-butenylene, 3-phenyl-2-butenylene, 3-propylenephenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene, and hexenylene.

Examples of the anion group of the polyanion include $—O—SO_3^-X^+$, $—SO_3^-X^+$, and $—COO^- X^+$ (wherein, $X^+$ in each of the formulas represents a hydrogen ion or an alkali metal ion).

In other words, the polyanion is a polymer acid containing sulfo groups and/or carboxy groups. Of the above anion groups, from the viewpoint of achieving favorable doping of the π-conjugated conductive polymer, $—SO_3^-X^+$ and $—COO^-X^+$ groups are preferred.

Furthermore, these anion groups may be positioned on adjacent units within the main chain of the polyanion, or with a predetermined spacing therebetween.

Of the above polyanions, in terms of solvent solubility and conductivity, polyisoprenesulfonic acid, copolymers that include polyisoprenesulfonic acid, polysulfoethyl methacrylate, copolymers that include polysulfoethyl methacrylate, poly(4-sulfobutyl methacrylate), copolymers that include poly(4-sulfobutyl methacrylate), polymethacryloxybenzenesulfonic acid, copolymers that include polymethacryloxybenzenesulfonic acid, polystyrenesulfonic acid, and copolymers that include polystyrenesulfonic acid are preferred.

The polymerization degree of the polyanion is preferably within a range from 10 to 100,000 monomer units, and from the viewpoints of solvent solubility and conductivity is even more preferably within a range from 50 to 10,000 monomer units.

The amount of the polyanion is preferably within a range from 0.1 to 10 mols, and more preferably from 1 to 7 mols, per 1 mol of the π-conjugated conductive polymer. If the amount of the polyanion is less than 0.1 mols, then the doping effect on the π-conjugated conductive polymer tends to weaken, and the conductivity may be unsatisfactory. Moreover, the dispersibility or solubility within solvents also deteriorates, making it difficult to obtain a uniform dispersion. On the other hand, if the amount of the polyanion exceeds 10 mols, then the amount of the π-conjugated conductive polymer is reduced, making it difficult to achieve a satisfactory degree of conductivity.

The polyanion is coordinated to the π-conjugated conductive polymer. As a result, the π-conjugated conductive polymer and the polyanion are forming a complex.

The combined amount of the π-conjugated conductive polymer and the polyanion is preferably within a range from 0.05 to 5.0% by mass, and more preferably within a range from 0.5 to 4.0% by mass, per 100% by mass of the solid component as a whole. If the combined amount of the π-conjugated conductive polymer and the polyanion is less than 0.05% by mass, then the resulting conductivity may be inadequate. On the other hand, if the combined amount of the π-conjugated conductive polymer and the polyanion exceeds 5.0% by mass, then a uniform conductive coating film may not be achieved.

[Conductivity Improver]

It is preferable that at least at least one conductivity improver selected from the following compounds (a) to (h) be contained in the aqueous conductive polymer solution: i.e., (a) a nitrogen-containing aromatic heterocyclic compound;

(b) a compound containing two or more hydroxy groups;

(c) a compound containing two or more carboxy groups;

(d) a compound containing one or more hydroxy groups and one or more carboxy groups;

(e) a compound containing an amide group;

(f) a compound containing an imide group;

(g) a lactam compound; and (h) a compound containing a glycidyl group.

(a) Nitrogen-Containing Aromatic Heterocyclic Compound

Examples of the nitrogen-containing aromatic heterocyclic compound include pyridines or derivatives thereof containing a single nitrogen atom, imidazoles or derivatives thereof, pyrimidines or derivatives thereof, and pyrazines or derivatives thereof containing two nitrogen atoms, and triazines or derivatives thereof containing three nitrogen atoms. In terms of factors such as solvent solubility, pyridines or derivatives thereof, imidazoles or derivatives thereof, and pyrimidines or derivatives thereof are preferred.

Specific examples of pyridines or derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxyaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxyaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, and 3-pyridinesulfonic acid.

Specific examples of imidazoles or derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole (N-hydroxyethylimidazole), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, and 2-(2-pyridyl)benzimidazole.

Specific examples of pyrimidines or derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, and 2,4-pyrimidinediol.

Specific examples of pyrazines or derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine, and 2,3-diethylpyrazine.

Specific examples of triazines or derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, disodium 3-(2-pyridine)-5,6-bis(4-phenylsulofnic acid)-1,2,4-triazine, 3-(2-pyridine)-5,6-diphenyl-1,2,4-triazine, disodium 3-(2-pyridine)-5,6-diphenyl-1,2,4-triazine-p,p'-disulfonic acid, and 2-hydroxy-4,6-dichloro-1,3,5-triazine.

The amount of the nitrogen-containing aromatic cyclic compound is preferably within a range from 0.1 to 100 mol, and even more preferably from 0.5 to 30 mol, per 1 mol of anionic group units within the polyanion. From the viewpoint of the conductivity, this amount is most preferably within a range from 1 to 10 mol. If the amount of the nitrogen-containing aromatic cyclic compound is less than 0.1 mol, then the interaction between the nitrogen-containing aromatic cyclic compound and the polyanion and π-conjugated conductive polymer tends to weaken, and the resulting conductivity may be inadequate. On the other hand, if the amount of the nitrogen-containing aromatic cyclic compound exceeds 100 mol, then the amount of the π-conjugated conductive polymer is reduced, which makes it difficult to achieve a satisfactory degree of conductivity.

(b) Compound Containing Two or More Hydroxy Groups

Examples of the compounds containing two or more hydroxy groups include polyhydric aliphatic alcohols such as propylene glycol, 1,3-butylene glycol, 1,4-butylene glycol, glycerol, diglycerol, D-glucose, D-glucitol, isoprene glycol, dimethylolpropionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glucose, tartaric acid, D-glucaric acid, and glutaconic acid; polymer alcohols such as cellulose, polysaccharides, and sugar alcohols; and aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof; 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, phenyl 1,4-dihydroxy-2-naphthoate, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate, ethyl gallate, and potassium hydroquinonesulfonate.

The amount of the compound containing two or more hydroxy groups is preferably within a range from 0.05 to 50 mol, and even more preferably from 0.3 to 10 mol, per 1 mol of anionic group units within the polyanion. If the amount of the compound containing two or more hydroxy groups is less than 0.05 mol per 1 mol of anionic group units within the polyanion, then the resulting conductivity and heat resistance may be inadequate. On the other hand, if the amount of the compound containing two or more hydroxy groups exceeds 50 mol per 1 mol of anionic group units within the polyanion, then the amount of the π-conjugated conductive polymer within the resulting conductive coating film is reduced, which makes it difficult to achieve a satisfactory degree of conductivity.

(c) Compound Containing Two or More Carboxy Groups

Examples of the compound containing two or more carboxy groups include aliphatic carboxylic acid compounds such as maleic acid, fumaric acid, itaconic acid, citraconic acid, malonic acid, 1,4-butanedicarboxylic acid, succinic acid, tartaric acid, adipic acid, D-glucaric acid, glutaconic acid, and citric acid; aromatic carboxylic acid compounds containing at least one carboxy group bonded to an aromatic ring, such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydride, benzophenonetetracarboxylic dianhydride, naphthalenedicarboxylic acid, trimellitic acid, and pyromellitic acid; as well as diglycolic acid, oxydibutyric acid, thiodiacetic acid, thiodibutyric acid, iminodiacetic acid, and iminobutyric acid.

The amount of the compound containing two or more carboxy groups is preferably within a range from 0.1 to 30 mol, and even more preferably from 0.3 to 10 mol, per 1 mol of anionic group units within the polyanion. If the amount of the compound containing two or more carboxy groups is less than 0.1 mol per 1 mol of anionic group units within the polyanion, then the resulting conductivity and heat resistance may be inadequate. On the other hand, if the amount of the compound containing two or more carboxy groups exceeds 30 mol per 1 mol of anionic group units within the polyanion, then the amount of the π-conjugated conductive polymer within the resulting conductive coating film is reduced, which makes it difficult to achieve a satisfactory degree of conductivity.

(d) Compound Containing One or More Hydroxy Groups and One or More Carboxy Groups Examples of the compound containing one or more hydroxy groups and one or more carboxy groups include tartaric acid, glyceric acid, dimethylolbutanoic acid, dimethylolpropanoic acid, D-glucaric acid, and glutaconic acid.

The amount of the compound containing one or more hydroxy groups and one or more carboxy groups is preferably within a range from 1 to 5,000 parts by mass, and even more preferably from 50 to 500 parts by mass, per 100 parts by mass of the combination of the polyanion and the π-conjugated conductive polymer. If the amount of the compound containing one or more hydroxy groups and one or more carboxy groups is less than 1 part by mass, then the resulting conductivity and heat resistance may be inadequate. On the other hand, if the amount of the compound containing one or more hydroxy groups and one or more carboxy groups exceeds 5,000 parts by mass, then the amount of the π-conjugated conductive polymer within the resulting conductive coating film is reduced, making it difficult to achieve a satisfactory degree of conductivity.

(e) Amide Compound

The compound containing an amide group is a monomolecular compound having an amide linkage represented by —CO—NH— (wherein the CO portion incorporates a double bond) within the molecule. In other words, examples of the amide compound include compounds that contain functional groups at both terminals of the above linkage, compounds in which a cyclic compound is bonded to one of the terminals of the above linkage, urea, in which the functional groups at both of the above terminals are hydrogen atoms, and urea derivatives.

Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butylamide, isobutylamide, methacrylamide, palmitamide, stearylamide, oleamide, oxamide, glutaramide, adipamide, cinnamamide, glucolamide, lactamide, glyceramide, tartaramide, citramide, glyoxylamide, pulvamide, acetoacetamide, dimethylacetamide, benzylamide, anthranylamide, ethylenediaminetetraacetamide, diacetamide, triacetamide, dibenzamide, tribenzamide, rhodanine, urea, 1-acetyl-2-thiourea, biuret, butylurea, dibutylurea, 1,3-dimethylurea, 1,3-diethylurea, and derivatives thereof.

Furthermore, acrylamides may also be used as an amide compound. Specific examples of these acrylamides include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, 2-hydroxyethylacrylamide, 2-hydroxyethylmethacrylamide, N-methylolacrylamide and N-methylolmethacrylamide.

The molecular weight of the amide compound is preferably within a range from 46 to 10,000, more preferably from 46 to 5,000, and still more preferably from 46 to 1,000.

The amount of the amide compound is preferably within a range from 1 to 5,000 parts by mass, and more preferably from 50 to 500 parts by mass, per 100 parts by mass of the combination of the polyanion and the π-conjugated conductive polymer. If the amount of the amide compound is less than 1 part by mass, then the resulting conductivity and the heat resistance may be inadequate. On the other hand, if the amount of the amide compound exceeds 5,000 parts by mass, then the amount of the π-conjugated conductive polymer within the resulting conductive coating film is reduced, making it difficult to achieve a satisfactory degree of conductivity.

(f) Imide Compound

As the amide compound, a monomolecular compound containing an imide linkage (hereafter referred to as an imide compound) is preferred, as it yields a greater improvement in the conductivity. Examples of the imide compound, described in terms of the molecular skeleton, include phthalimide and phthalimide derivatives, succinimide and succinimide derivatives, benzimide and benzimide derivatives, maleimide and maleimide derivatives, and naphthalimide and naphthalimide derivatives.

Further, the imide compounds are classified as either aliphatic imides or aromatic imides or the like on the basis of the functional groups at the two terminals, and from the viewpoint of solubility, aliphatic imides are preferred.

Moreover, aliphatic imide compounds can be classified into saturated aliphatic imide compounds, which contain one or more saturated bonds between the carbon atoms within the molecule, and unsaturated aliphatic imide compounds, which contain one or more unsaturated bonds between the carbon atoms within the molecule.

Saturated aliphatic imide compounds are compounds represented by the formula: $R^1$—CO—NH—CO—$R^2$, wherein $R^1$ and $R^2$ are both saturated hydrocarbon groups. Specific examples include cyclohexane-1,2-dicarboximide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboximide, semicarbazide, α,α-dimethyl-6-methylsuccinimide, bis[2-(succinimidooxycarbonyloxy)ethyl]sulfone, α-methyl-α-propylsuccinimide and cyclohexylimide.

Unsaturated aliphatic imide compounds are compounds represented by the formula: $R^1$—CO—NH—CO—$R^2$, wherein either one of, or both, $R^1$ and $R^2$ contain one or more unsaturated bonds. Specific examples include 1,3-dipropyleneurea, maleimide, N-methylmaleimide, N-ethylmaleimide, N-hydroxymaleimide, 1,4-bismaleimidobutane, 1,6-bismaleimidohexane, 1,8-bismaleimidooctane and N-carboxyheptylmaleimide.

The molecular weight of the imide compound is preferably within a range from 60 to 5,000, more preferably from 70 to 1,000, and still more preferably from 80 to 500.

The amount of the imide compound is preferably within a range from 10 to 10,000 parts by mass, and more preferably from 50 to 5,000 parts by mass, per 100 parts by mass of the combination of the π-conjugated conductive polymer and the polyanion. If the amounts of the amide compound and the imide compound are less than the lower limits of the respective ranges mentioned above, then the effects achieved by adding the amide compound and/or the imide compound tend to diminish, which is undesirable. On the other hand, if the amounts exceed the upper limits of the respective ranges, then the conductivity tends to decrease as a result of a reduction in the concentration of the π-conjugated conductive polymer, which is also undesirable.

(g) Lactam Compound

A lactam compound is an intramolecular cyclic amide of an aminocarboxylic acid, and is a compound in which a portion of the ring can be represented by —CO—NR— (wherein R is a hydrogen atom or an arbitrary substituent). One or more of the carbon atoms within the ring may be unsaturated or substituted for a hetero atom.

Examples of the lactam compound include pentano-4-lactam, 4-pentanelactam-5-methyl-2-pyrrolidone, 5-methyl-2-pyrrolidinone, hexano-6-lactam, and 6-hexanelactam.

The amount of the lactam compound is preferably within a range from 10 to 10,000 parts by mass, and more preferably from 50 to 5,000 parts by mass, per 100 parts by mass of the combination of the π-conjugated conductive polymer and the polyanion. If the amount added of the lactam compound is less than the lower limit of the above range, then the effects achieved by adding the lactam compound tend to diminish, which is undesirable. On the other hand, if the amount exceeds the upper limit of the above range, then the conductivity tends to decrease as a result of the reduction in the concentration of the π-conjugated conductive polymer, which is also undesirable.

(h) Compound Containing a Glycidyl Group

Examples of the compound containing a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A, diglycidyl ether, glycidyl ether acrylate and glycidyl ether methacrylate.

The amount of the compound containing a glycidyl group is preferably within a range from 10 to 10,000 parts by mass, and more preferably from 50 to 5,000 parts by mass, per 100 parts by mass of the combination of the π-conjugated conductive polymer and the polyanion. If the amount added of the compound containing a glycidyl group is less than the lower limit of the above range, then the effects achieved by adding the compound containing a glycidyl group tend to diminish, which is undesirable. On the other hand, if the amount exceeds the upper limit of the above range, then the conductivity tends to decrease as a result of the reduction in the concentration of the π-conjugated conductive polymer, which is also undesirable.

[Method for Preparing Aqueous Conductive Polymer Solution]

An aqueous conductive polymer solution can be prepared, for example, by the following method.

That is, a polyanion is first dispersed or dissolved in water, and a precursor monomer that forms π-conjugated conductive polymer is then added to the resulting solution, thereby yielding a monomer dispersion. Subsequently, an oxidizing agent is added to a monomer dispersion to polymerize a precursor monomer, and excess oxidizing agent and unreacted monomer are then removed. Then, the resultant is purified, and if necessary, a conductivity improver is added thereto, thereby obtaining an aqueous conductive polymer solution.

(Freeze-Drying Step)

In the freeze-drying step, an aqueous conductive polymer solution is freeze-dried to obtain a complex in the form of a solid matter. In the freeze-drying process, vacuum drying is conducted by freezing the water content. According to such a drying process, not only the obtained solid matter is likely to become porous but also the contraction hardly occurs.

Known freeze dryers may be used for the freeze-drying process.

Further, in the freeze-drying step, it is preferable to make the water content in the solid complex within a range from 3 to 50% by mass, and more preferably from 5 to 40% by mass. By making the water content in the solid complex at least 3% by mass, the polarization of polyanions hardly occurs, and amine compounds can be easily coordinated. On the other hand, when the water content in the solid complex is 50% by mass or less, the water content in the conductive polymer solution can be reduced even further, and the binder resin can be mixed more easily.

In order to make the water content within the above-mentioned range, for example, the freeze-drying time, the freeze-drying temperature, the degree of vacuum or the like may be adjusted. For example, the shorter the freeze-drying time, the shorter the freeze-drying temperature or the higher the degree of vacuum, the higher the water content.

Further, in the freeze-drying step, it is preferable to make the BET specific surface area of the solid complex within a range from 5 to 200 $m^2/g$, and more preferably from 10 to 100 $m^2/g$. By making the BET specific surface area of the solid complex 5 $m^2/g$ or more, an amine compound is readily coordinated to the complex in the dispersion step and dispersibility in an organic solvent is further enhanced. On the other hand, if the BET specific surface area of the solid complex is 200 $m^2/g$ or less, the water content of the solid complex can be readily reduced.

In order to make the BET specific surface area within the above-mentioned range, for example, the freeze-drying time, the freeze-drying temperature, the degree of vacuum or the like may be adjusted. For example, the shorter the freeze-drying time, the larger the BET specific surface area.

[Dispersion Step]

In the dispersion step, an organic solvent and an amine compound are added to the above-mentioned solid complex to prepare a complex solution, and the complex solution is then subjected to a dispersion treatment.

When adding an organic solvent, either one of an organic solvent and an amine compound may be added first, or both of them may be added at the same time.

Examples of the organic solvent include ether-based solvents such as diethyl ether, dimethylether, ethylene glycol, propylene glycol, propylene glycol monoalkyl ether and propylene glycol dialkyl ether; ester-based solvents such as ethyl acetate, propyl acetate and butyl acetate; ketone-based solvents such as diethyl ketone, methyl propyl ketone, methyl butyl ketone, methyl isopropyl ketone, methyl isobutyl ketone, methyl amyl ketone, diisopropyl ketone, methyl ethyl ketone and acetone; aromatic solvents such as benzene, toluene, xylene, ethylbenzene, propylbenzene and isopropylbenzene; alcohol-based solvents such as ethanol, propanol, isopropyl alcohol, butanol and allyl alcohol; and amide-based solvents such as N-methylpyrrolidone, dimethylacetamide and dimethylformamide. However, the organic solvent is not limited to the above examples. These organic solvents may be used individually or may be mixed for use.

The water content of the organic solvent is 4% by mass or less, preferably 3% by mass or less, and more preferably 2% by mass or less. If the water content of the organic solvent exceeds 4% by mass, the residual water content in the obtained conductive polymer solution becomes high.

The amount of organic solvent added is adjusted so that the solid fraction concentration of the π-conjugated conductive polymer and the polyanion is preferably within a range from 0.1 to 10% by mass, more preferably within a range from 0.2 to 5% by mass.

If the solid fraction concentration of the π-conjugated conductive polymer and the polyanion is 0.1% by mass or more, electrical conductivity of the conductive coating film obtained from the conductive polymer solution is enhanced. On the other hand, if the solid fraction concentration of the π-conjugated conductive polymer and the polyanion is 10% by mass or less, the occurrence of gelation is unlikely, and adjustments can be made at an adequate viscosity.

[Amine Compound]

The amine compound added in the dispersion step is not limited as long as the compound coordinates to or binds to the anion group of the polyanion. Here, the coordination or binding refers to a bonding form in which, due to the donation/acceptance of electrons with each other between the polyanion and the amine compound, their intermolecular distance is shortened.

Examples of the amine compound include a primary amine, a secondary amine, a tertiary amine, and an aromatic amine.

Examples of the primary amine include monomethylamine, monoethylamine, monopropylamine, monobutylamine, monopentylamine, monohexylamine, monoheptylamine, monooctylamine, monodecylamine, monoundecylamine, monododecylamine and monostearylamine.

Examples of the secondary amine include dimethylamine, diethylamine, dipropylamine, dibutylamine, dipentylamine, dihexylamine, diheptylamine, dioctylamine, didecylamine, diundecylamine and didodecylamine.

Examples of the tertiary amine include trimethylamine, triethylamine, tripropylamine, tributylamine, tripentylamine, trihexylamine, triheptylamine, trioctylamine, tridecylamine, diundecylamine, tridodecylamine, triphenylamine, tribenzylamine, triperfluoropropylamine, triperfluorobutylamine, triethanolamine and triisopropanolamine.

Examples of the aromatic amine include imidazole, N-methyl-imidazole, N-ethyl-imidazole, N-propyl-imidazole, N-butyl-imidazole, N-pentyl-imidazole, N-hexyl-imidazole, N-heptyl-imidazole, N-octyl-imidazole, N-decyl-imidazole, N-undecyl-imidazole, N-dodecyl-imidazole, 2-heptylimidazole and pyridine.

Of the above examples, tertiary amines are preferred since the adverse effects on the electrical conductivity of the π-conjugated conductive polymer (i.e., undoping by an alkaline component) is small.

The molecular weight of the amine compound is preferably within a range from 50 to 2,000 in view of the solubility in an organic solvent.

The amount of the amine compound is preferably within a range from 0.1 to 10 molar equivalents, more preferably from 0.5 to 2.0 molar equivalents, and particularly preferably from 0.85 to 1.25 molar equivalents, with respect to the polyanion.

If the amount of the amine compound is at least as large as the aforementioned lower limit, since the amine compound is coordinated to substantially all of anion groups within the polyanion, solubility of the π-conjugated conductive polymer in an organic solvent is further enhanced. On the other hand, if the amount of the amine compound is not more than the aforementioned upper limit, since excess amine compound is not contained in the conductive polymer solution, deterioration of the electrical conductivity and mechanical properties of the obtained conductive coating film can be prevented.

It is preferable to use a mixing disperser which can provide a high level of shearing force in the adding/dispersing process in the dispersion step. Examples of the mixing disperser include a homogenizer, a high-pressure homogenizer and a bead mill, and a high-pressure homogenizer is particularly preferred.

Specific examples of high-pressure homogenizers include the Nanomizer (product name) manufactured by Yoshida Kikai Co., Ltd., the Microfluidizer (product name) manufactured by Microfluidics International Corporation, and the Altimizer (product name) manufactured by Sugino Machine Limited.

Specific examples of the dispersion treatment using a high-pressure homogenizer include a treatment involving counter collision of a complex solution prior to the dispersion treatment at high pressure, and a treatment involving passing through an orifice or a slit at high pressure.

When conducting a dispersion treatment using a mixing disperser, in principal, the temperature of the conductive polymer solution obtained by the treatment increases. For this reason, it is preferable to adjust the temperature of the complex solution prior to the dispersion treatment within a range from −20 to 60° C., more preferably from −10 to 40° C., and particularly preferably from −5 to 30° C. If the temperature of the complex solution is adjusted to −20° C. or higher, freezing of the solution can be prevented. On the other hand, if the temperature of the complex solution is adjusted to 60° C. or lower, deterioration of the π-conjugated conductive polymer or the polyanion can be prevented.

Alternatively, the conductive polymer solution following the dispersion treatment may be cooled by, for example, being passed through a heat exchanger having a coolant temperature of −30 to 20° C.

In the dispersion step, a dispersion treatment is conducted so that the cumulant average particle size of the complex is preferably 2,000 nm or less, more preferably 500 nm or less, and particularly preferably 200 nm or less. By carrying out a dispersion treatment so that the cumulant average particle size of the complex is 2,000 nm or less, stability of the obtained conductive polymer solution is enhanced, and precipitation of the complex can be prevented.

The cumulant average particle size can be determined from the measurement of particle size distribution by dynamic light scattering.

The cumulant average particle size can be adjusted by mixing conditions (for example, a pressure level or the like) in the dispersion step. More specifically, the higher the pressure, the smaller the average particle size.

[Binder Resin]

Following the dispersion treatment, a binder resin can be mixed, which dissolves in an amount of 1 g or less in 100 g of water.

There are no particular limitations on the binder resin, provided it is compatible with, or mixable and dispersible within, an antistatic coating, and either thermosetting resins or thermoplastic resins may be used. Examples of the binder resin include polyesters such as polyethylene terephthalate, polybutylene terephthalate and polyethylene naphthalate; polyimides such as polyimide and polyamideimide; polyamides such as polyamide 6, polyamide 66, polyamide 12 and polyamide 11; fluororesins such as polyvinylidene fluoride, polyvinyl fluoride, polytetrafluoroethylene, ethylene-tetrafluoroethylene copolymer, and polychlorotrifluoroethylene; vinyl resins such as polyvinyl alcohol, polyvinyl ether, polyvinyl butyral, polyvinyl acetate and polyvinyl chloride; epoxy resins; oxetane resins; xylene resins; aramid resins; polyimide silicone; polyurethane; polyurea; melamine resins; phenolic resins; polyethers; acrylic resins; and copolymers thereof.

In addition, if required, a crosslinking agent, a curing agent such as a polymerization initiator, a polymerization accelerator, a solvent, a viscosity modifier, or the like can be added to the binder resin for use.

Among these binder resins, any one or more of polyurethane, polyesters, acrylic resins, polyamides, polyimides, epoxy resins and polyimide silicone are preferably used because these are easy to mix. In addition, acrylic resins not only have high hardness but also exhibit excellent transparency, and thus are suitably used for applications such as optical filters.

Further, the binder resin preferably contains a liquid polymer that is hardened by thermal energy and/or light energy.

Here, examples of the liquid polymer that is cured by thermal energy include a reactive polymer and a self-crosslinking polymer.

The reactive polymers are polymers obtained by polymerizing a monomer having a substituent, and examples of the substituent include a hydroxy group, a carboxy group, an acid anhydride, an oxetane-based group, a glycidyl group, and an amino group. Specific examples of the monomers include polyfunctional alcohols such as ethylene glycol, diethylene glycol, dipropylene glycol and glycerin; carboxylic acid compounds such as malonic acid, succinic acid, glutamic acid, pimelic acid, ascorbic acid, phthalic acid, acetylsalicylic acid, adipic acid, isophthalic acid, benzoic acid and m-toluic acid; acid anhydrides such as maleic acid anhydride, phthalic acid anhydride, dodecylsuccinic anhydride, dichloromaleic anhydride, tetrachlorophthalic anhydride, tetrahydrophthalic anhydride and pyromellitic acid anhydride; oxetane compounds such as 3,3-dimethyloxetane, 3,3-dichloromethyloxetane, 3-methyl-3-hydroxymethyloxetane and azidomethylmethyloxetane; glycidyl ether compounds such as bisphenol A diglycidyl ether, bisphenol F diglycidyl ether, phenol novolac polyglycidyl ether, N,N-diglycidyl-p-aminophenol glycidyl ether, tetrabromobisphenol A diglycidyl ether and hydrogenated bisphenol A diglycidyl ether (i.e., 2,2-bis(4-glycidyloxycyclohexyl)propane); glycidyl amine compounds such as N,N-diglycidylaniline, tetraglycidyldiaminodiphenylmethane, N,N,N,N-tetraglycidyl-m-xylylenediamine, triglycidyl isocyanuate and N,N-diglycidyl-5,5-dialkylhydantoin; amine compounds such as diethylenetriamine, triethylenetetramine, dimethylaminopropylamine, N-aminoethylpiperazine, benzyldimethylamine, tris(dimethylaminomethyl)phenol, DHP30-tri(2-ethylhexoate), metaphenylenediamine, diaminodiphenylmethane, diaminodiphenylsulfone, dicyanodiamide, boron trifluoride, monoethylamine, methanediamine, xylenediamine and ethylmethylimidazole; and glycidyl compounds based on epichlorohydrin of bisphenol A in compounds containing two or more oxirane rings in one single molecule or their analogs.

At least bifunctional or higher crosslinking agents are used in the reactive polymers. Examples of the crosslinking agents include melamine resins, epoxy resins and metal oxides. As the metal oxide, basic metal compounds such as $Al(OH)_3$, $Al(OOC.CH_3)_2(OOCH)$, $Al(OOC.CH_3)_3$, $ZrO(OCH_3)$, $Mg(OOC.CH_3)_2$, $Ca(OH)_2$, $Ba(OH)_3$, and the like can be used where appropriate.

The self-crosslinking polymers are polymers that self-crosslink with each other through functional groups therein due to heating, and examples thereof include those containing glycidyl and carboxy groups or those containing N-methylol and carboxy group.

Examples of the liquid polymer that is cured by light energy include oligomers or prepolymers such as polyester, epoxy resin, oxetane resin, polyacryl, polyurethane, polyimide, polyamide, polyamideimide and polyimide silicone.

Examples of the monomer units constituting a liquid polymer that is cured by light energy include monofunctional monomers and polyfunctional monomers of acrylates such as bisphenol A/ethylene oxide-modified diacrylate, dipentaerythritol hexa(penta)acrylate, dipentaerythritol monohydroxy pentacrylate, dipropylene glycol diacrylate, trimethylolpropane triacrylate, glycerin propoxy triacrylate, 4-hydroxybutyl acrylate, 1,6-hexanediol diacrylate, 2-hydroxyethyl acrylate, 2-hydroxypropyl acrylate, isobornyl acrylate, polyethylene glycol diacrylate, pentaerythritol triacrylate, tetrahydrofurfuryl acrylate, trimethylolpropane triacrylate and tripropylene glycol diacrylate; methacrylates such as tetraethylene glycol dimethacrylate, alkyl methacrylates, allyl methacrylate, 1,3-butylene glycol dimethacrylate, n-butyl methacrylate, benzyl methacrylate, cyclohexyl methacrylate, diethylene glycol dimethacrylate, 2-ethylhexyl methacrylate, glycidyl methacrylate, 1,6-hexanediol dimethacrylate, 2-hydroxyethyl methacrylate, isobornyl methacrylate, lauryl methacrylate, phenoxyethyl methacrylate, t-butyl methacrylate, tetrahydrofurfuryl methacrylate and trimethylolpropane trimethacrylate; glycidyl ethers such as allyl glycidyl ether, butyl glycidyl ether, higher alcohol glycidyl ether, 1,6-hexanediol glycidyl ether, phenyl glycidyl ether and stearyl glycidyl ether; acryl (methacryl) amides such as diacetoneacrylamide, N,N-dimethylacrylamide, dimethylaminopropylacrylamide, dimethylaminopropylmethacrylamide, methacrylamide, N-methylolacrylamide, N,N-dimethylmethacrylamide, acryloylmorpholine, N-vinylformamide, N-methylacrylamide, N-isopropylacrylamide, N-t-butylacrylamide, N-phenylacrylamide, acryloyl piperizine and 2-hydroxyethyl acrylamide; vinyl ethers such as 2-chloroethyl vinyl ether, cyclohexyl vinyl ether, ethyl vinyl ether, hydroxybutyl vinyl ether, isobutyl vinyl ether and triethylene glycol vinyl ether; vinyl carboxylates such as vinyl butyrate, vinyl monochloroacetate and vinyl pivalate.

The liquid polymer cured by light energy is cured by a photopolymerization initiator. Examples of the photopolymerization initiators include acetophenones, benzophenones, Michler's benzoyl benzoates, α-amyloxime esters, tetramethylthiuram monosulfides, or thioxanthones. Further, as a photosensitizer, n-butylamine, triethylamine, tri-n-butylphosphine or the like can be mixed.

Furthermore, examples of cationic polymerization initiators include aryl diazonium salts, diaryl halonium salts, triphenyl sulfonium salts, silanol/aluminum chelates and α-sulfonyloxyketones.

In the method for producing a conductive polymer solution according to the present invention, an organic solvent is added to a solid complex obtained from an aqueous conductive polymer solution by freeze-drying. Since the freeze dried solid complex is a porous material, an organic solvent readily penetrates therein. Further, by adding an amine compound to the solid complex, the solubility in an organic solvent can be improved.

Therefore, in the method for producing a conductive polymer solution according to the present invention, a wide variety of organic solvents can be used, and a complex including a π-conjugated conductive polymer and a polyanion can be readily dissolved in an organic solvent.

Furthermore, according to the method for producing a conductive polymer solution of the present invention, the water content in the obtained conductive polymer solution can be reduced.

<Method for Using Conductive Polymer Solution>

The conductive polymer solution is used by being coated on a substrate. Here, as a substrate, for example, a resin film, a glass plate or the like is used, and a resin film is preferred since it exhibits high levels of transparency and flexibility.

Examples of the resin materials constituting the resin film include polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene fluoride, polyallylate, a styrene-based elastomer, a polyester-based elastomer, polyethersulfone, polyetherimide, polyetheretherketone, polyphenylene sulfide, polyimide, cellulose triacetate and cellulose acetate propionate. Among these resin materials, polyethylene terephthalate is particularly preferred in view of the strength or the like.

As a coating method, for example, a comma coating method, a reverse coating method, a lip coating method, a microgravure coating method or the like may be employed.

When containing a thermosetting binder resin or a photocurable binder resin, it is preferable to conduct a curing treatment following the application of the conductive polymer solution.

As a curing method, heating or light irradiation may be employed. As a heating method, for example, common methods such as hot air heating or infrared heating can be adopted. Furthermore, when curing is conducted by light irradiation, methods that involve irradiation of ultraviolet light from a light source such as an ultra high-pressure mercury lamp, high-pressure mercury lamp, low-pressure mercury lamp, carbon arc lamp, xenon arc lamp, or metal halide lamp can be adopted.

EXAMPLES

In the following Examples, the specific surface area refers to the BET specific surface area measured by nitrogen adsorption. The water content is measured by the Karl Fischer Method. The cumulant average particle size was measured using FPR1000 (manufactured by Otsuka Electronics Co., Ltd.). The surface resistance was measured using HIRESTA (manufactured by Mitsubishi Chemical Corporation). The total light transmittance and haze were measured using a haze meter (NDH5000, manufactured by Nippon Denshoku Industries Co., Ltd.) in accordance with JIS K 7136.

Production Example 1

14.2 g (0.1 mol) of 3,4-ethylenedioxythiophene, and a solution prepared by dissolving 27.5 g (0.15 mol) of a polystyrenesulfonic acid (weight average molecular weight: about 150,000) in 2,000 ml of ion exchanged water were mixed at 20° C., thereby yielding a monomer dispersion.

The thus obtained monomer dispersion was held at 20° C., and with constant stirring, a solution containing 29.64 g (0.13 mol) of ammonium persulfate dissolved in 200 ml of ion exchanged water, and 8.0 g (0.02 mol) of a ferric sulfate oxidation catalyst solution were added, and the resulting mixture was then stirred for 12 hours to allow the reaction to proceed.

The resulting reaction mixture was subjected to a dialysis treatment, thereby removing the unreacted monomer, oxidizing agent and oxidation catalyst, and yielding a blue aqueous solution containing approximately 1.5% by mass of a polystyrenesulfonic acid-doped poly(3,4-ethylenedioxythiophene) (hereafter, referred to as the PSS-PEDOT aqueous solution).

Production Example 2

6.7 g (0.1 mol) of pyrrole, and a solution prepared by dissolving 18.3 g (0.1 mol) of a polystyrenesulfonic acid (weight average molecular weight: about 400,000) in 2,000 ml of ion exchanged water were mixed at 20° C., thereby yielding a monomer dispersion.

The thus obtained monomer dispersion was held at 20° C., and with constant stirring, a solution containing 29.64 g (0.13 mol) of ammonium persulfate dissolved in 200 ml of ion exchanged water, and 8.0 g (0.02 mol) of a ferric sulfate oxidation catalyst solution were added, and the resulting mixture was then stirred for 12 hours to allow the reaction to proceed.

The resulting reaction mixture was subjected to a dialysis treatment, thereby removing the unreacted monomer, oxidizing agent and oxidation catalyst, and yielding a blue aqueous solution containing approximately 1.5% by mass of a polystyrenesulfonic acid-doped polypyrrole.

Production Example 3

9.3 g (0.1 mol) of aniline, and a solution prepared by dissolving 27.5 g of a polystyrenesulfonic acid (weight average molecular weight: about 150,000) in 2,000 ml of ion exchanged water were mixed at 20° C., thereby yielding a monomer dispersion.

The thus obtained monomer dispersion was held at 20° C., and with constant stirring, a solution containing 29.64 g (0.13 mol) of ammonium persulfate dissolved in 200 ml of ion exchanged water, and 8.0 g (0.02 mol) of a ferric sulfate oxidation catalyst solution were added, and the resulting mixture was then stirred for 12 hours to allow the reaction to proceed.

The resulting reaction mixture was subjected to a dialysis treatment, thereby removing the unreacted monomer, oxidizing agent and oxidation catalyst, and yielding a green aqueous solution containing approximately 1.5% by mass of a polystyrenesulfonic acid-doped polyaniline.

Production Example 4

The PSS-PEDOT aqueous solution obtained in Production Example 1 was subjected to freeze-drying for 6 hours using a freeze dryer (product name: FDU1200, manufactured by Tokyo Rikakikai Co., Ltd.), thereby obtaining a solid complex. The obtained solid complex had a specific surface area of 22.5 $m^2/g$ and a water content of 10.2% by mass.

Production Example 5

The PSS-PEDOT aqueous solution obtained in Production Example 1 was subjected to freeze-drying for 10 hours using a freeze dryer, thereby obtaining a solid complex. The obtained solid complex had a specific surface area of 15.5 $m^2/g$ and a water content of 5.0% by mass.

Production Example 6

The aqueous solution of a polystyrenesulfonic acid-doped polypyrrole obtained in Production Example 2 was subjected to freeze-drying for 24 hours using a freeze dryer, thereby obtaining a solid complex. The obtained solid complex had a specific surface area of 5.8 $m^2/g$ and a water content of 6.5% by mass.

Production Example 7

The solution of a polystyrenesulfonic acid-doped polyaniline obtained in Production Example 3 was dried for 12 hours using a freeze dryer, thereby obtaining a solid complex. The obtained solid complex had a specific surface area of 6.9 $m^2/g$ and a water content of 15.1% by mass.

Example 1

0.6 g of the solid complex obtained in Production Example 4, 0.6 g of trioctylamine, and 99 g of isopropyl alcohol (water content: 0.9% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. Furthermore, the resulting mixture was subjected to a dispersion treatment at a pressure of 100 MPa using a high-pressure homogenizer (Nanomizer, manufactured by Yoshida Kikai Co., Ltd.), thereby yielding a conductive polymer solution.

The measured cumulant average particle size of a complex in the obtained conductive polymer solution was 456 nm.

3 g of pentaerythritol triacrylate, 0.1 g of thiodiacetic acid and 0.01 g of Irgacure 127 (manufactured by Ciba Specialty Chemicals Inc.) were added to 10 g of the obtained conductive polymer solution and mixed, thereby preparing a uniform solution. The thus obtained solution was applied on top of a polyethylene terephthalate film (Lumirror T60, manufactured by Toray Industries, Inc., having a total light transmittance of 88.5% and a haze of 3.8%) using a bar coater (No. 8), followed by ultraviolet irradiation thereto, thereby forming a conductive coating film. The surface resistance of this conductive coating film was measured. The results are shown in Table 1.

In addition, the total light transmittance and haze of a laminated product constituted of the polyethylene terephthalate film and the conductive coating film were measured. The results are shown in Table 1.

Example 2

0.5 g of the solid complex obtained in Production Example 5, 0.8 g of tridodecylamine, and 99 g of methyl ethyl ketone (water content: 0.3% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. Furthermore, the resulting mixture was subjected to a dispersion treatment at a pressure of 100 MPa using a high-pressure homogenizer, thereby yielding a conductive polymer solution.

The measured cumulant average particle size of a complex in the obtained conductive polymer solution was 583 nm.

3 g of pentaerythritol triacrylate, 0.1 g of hydroxyethylacrylamide and 0.01 g of Irgacure 127 (manufactured by Ciba Specialty Chemicals Inc.) were added to 10 g of the obtained conductive polymer solution and mixed, thereby preparing a uniform solution. The thus obtained solution was applied on top of a polyethylene terephthalate film (Lumirror T60, manufactured by Toray Industries, Inc., having a total light transmittance of 88.5% and a haze of 3.8%) using a bar coater (No. 8), followed by ultraviolet irradiation thereto, thereby forming a conductive coating film. The surface resistance of this conductive coating film was measured.

In addition, the total light transmittance and haze of a laminated product constituted of the polyethylene terephthalate film and the conductive coating film were measured. The results are shown in Table 1.

Example 3

0.3 g of the solid complex obtained in Production Example 4, 0.5 g of tridodecylamine, and 99 g of ethyl acetate (water content: 0.3% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. Furthermore, the resulting mixture was subjected to a dispersion treatment at a pressure of 150 MPa using a high-pressure homogenizer, thereby yielding a conductive polymer solution.

The measured cumulant average particle size of a complex in the obtained conductive polymer solution was 1,201 nm.

3 g of pentaerythritol triacrylate, 0.1 g of thiodiacetic acid and 0.01 g of Irgacure 127 (manufactured by Ciba Specialty Chemicals Inc.) were added to 10 g of the obtained conductive polymer solution and mixed, thereby preparing a uniform solution. The thus obtained solution was applied on top of a polyethylene terephthalate film (Lumirror T60, manufactured by Toray Industries, Inc., having a total light transmittance of 88.5% and a haze of 3.8%) using a bar coater (No. 8), followed by ultraviolet irradiation thereto, thereby forming a conductive coating film. The surface resistance of this conductive coating film was measured. The results are shown in Table 1.

In addition, the total light transmittance and haze of a laminated product constituted of the polyethylene terephthalate film and the conductive coating film were measured. The results are shown in Table 1.

Example 4

0.3 g of the solid complex obtained in Production Example 5, 0.5 g of tridodecylamine, and 99 g of toluene (water content: 0.03% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. Furthermore, the resulting mixture was subjected to a dispersion treatment at a pressure of 150 MPa using a high-pressure homogenizer, thereby yielding a conductive polymer solution.

The measured cumulant average particle size of a complex in the obtained conductive polymer solution was 435 nm.

3 g of pentaerythritol triacrylate, 0.1 g of thiodiacetic acid and 0.01 g of Irgacure 127 (manufactured by Ciba Specialty Chemicals Inc.) were added to 10 g of the obtained conductive polymer solution and mixed, thereby preparing a uniform solution. The thus obtained solution was applied on top of a polyethylene terephthalate film (Lumirror T60, manufactured by Toray Industries, Inc., having a total light transmittance of 88.5% and a haze of 3.8%) using a bar coater (No. 8), followed by ultraviolet irradiation thereto, thereby forming a conductive coating film. The surface resistance of this conductive coating film was measured. The results are shown in Table 1.

In addition, the total light transmittance and haze of a laminated product constituted of the polyethylene terephthalate film and the conductive coating film were measured. The results are shown in Table 1.

Example 5

0.6 g of the solid complex obtained in Production Example 6, 0.8 g of tridodecylamine, and 99 g of methyl ethyl ketone (water content: 0.3% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. Furthermore, the resulting mixture was subjected to a dispersion treatment at a pressure of 120 MPa using a high-pressure homogenizer, thereby yielding a conductive polymer solution.

The measured cumulant average particle size of a complex in the obtained conductive polymer solution was 1,315 nm.

3 g of pentaerythritol triacrylate, 0.1 g of thiodiacetic acid and 0.01 g of Irgacure 127 (manufactured by Ciba Specialty Chemicals Inc.) were added to 10 g of the obtained conductive polymer solution and mixed, thereby preparing a uniform solution. The thus obtained solution was applied on top of a polyethylene terephthalate film (Lumirror T60, manufactured by Toray Industries, Inc., having a total light transmittance of 88.5% and a haze of 3.8%) using a bar coater (No. 8), followed by ultraviolet irradiation thereto, thereby forming a conductive coating film. The surface resistance of this conductive coating film was measured. The results are shown in Table 1.

In addition, the total light transmittance and haze of a laminated product constituted of the polyethylene terephthalate film and the conductive coating film were measured. The results are shown in Table 1.

Example 6

0.6 g of the solid complex obtained in Production Example 7, 0.8 g of tri(2-ethylhexyl)amine, and 99 g of toluene (water content: 0.03% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. Furthermore, the resulting mixture was subjected to a dispersion treatment at a pressure of 120 MPa using a high-pressure homogenizer, thereby yielding a conductive polymer solution.

The measured cumulant average particle size of a complex in the obtained conductive polymer solution was 985 nm.

3 g of pentaerythritol triacrylate, 0.1 g of thiodiacetic acid and 0.01 g of Irgacure 127 (manufactured by Ciba Specialty Chemicals Inc.) were added to 10 g of the obtained conductive polymer solution and mixed, thereby preparing a uniform solution. The thus obtained solution was applied on top of a polyethylene terephthalate film (Lumirror T60, manufactured by Toray Industries, Inc., having a total light transmittance of 88.5% and a haze of 3.8%) using a bar coater (No. 8), followed by ultraviolet irradiation thereto, thereby forming a conductive coating film. The surface resistance of this conductive coating film was measured. The results are shown in Table 1.

In addition, the total light transmittance and haze of a laminated product constituted of the polyethylene terephthalate film and the conductive coating film were measured. The results are shown in Table 1.

Comparative Example 1

0.6 g of the solid complex obtained in Production Example 4 and 99 g of isopropyl alcohol (water content: 0.9% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. However, the solid complex did not dissolve, and even after another 1 hour of stirring by the homogenizer, the solid complex still did not dissolve. Since there was a possibility of clogging of the high-pressure homogenizer, a further dispersion treatment was abandoned.

Comparative Example 2

The PSS-PEDOT aqueous solution obtained in Production Example 1 was treated using a spray dryer (ADL311, manufactured by Yamato Scientific Co., Ltd.) at a spray pressure of 0.1 MPa and a drying temperature (inlet temperature) of 180° C., thereby obtaining a solid complex. The obtained solid complex had a specific surface area of 56.5 $m^2/g$ and a water content of 1.2% by mass.

0.3 g of the thus obtained solid complex, 0.5 g of tridodecylamine, and 99 g of toluene (water content: 0.03% by mass) were placed in a vessel and stirred for 2 hours using a Three-One Motor (manufactured by Shinto Scientific Co., Ltd.). Thereafter, the mixture was stirred for 10 minutes at a rotational frequency of 8,000 rpm using a homogenizer. However, the solid complex did not dissolve uniformly, and even after another 1 hour of stirring by the homogenizer, the solid complex still did not dissolve. Since there was a possibility of clogging of the high-pressure homogenizer, a further dispersion treatment was abandoned. The results are shown in Table 1.

TABLE 1

| | | Surface resistance (Ω) | Total light transmittance (%) | Haze (%) |
|---|---|---|---|---|
| Example | 1 | $6.8 \times 10^8$ | 88.2 | 3.4 |
| | 2 | $4.2 \times 10^8$ | 88.3 | 3.9 |
| | 3 | $9.8 \times 10^{10}$ | 88.5 | 3.4 |
| | 4 | $7.9 \times 10^{11}$ | 88.4 | 3.5 |
| | 5 | $4.2 \times 10^{11}$ | 85.2 | 7.9 |
| | 6 | $5.6 \times 10^{12}$ | 86.5 | 6.7 |
| Comparative | 1 | | Could not be measured | |
| Example | 2 | | Could not be measured | |

In Examples 1 to 6 where an organic solvent having a water content of 4% by mass or less and an amine compound were added to a solid complex obtained by freeze-drying, it was possible to uniformly include a complex containing π-conjugated conductive polymer and a polyanion in a conductive polymer solution. For this reason, the surface resistance of the resulting conductive coating film was sufficiently low.

On the other hand, in Comparative Example 1 where no amine compound was added and only an organic solvent was added to a solid complex obtained by freeze-drying, no conductive polymer solution was obtained.

Also in Comparative Example 2 where an organic solvent was added to a solid complex obtained by spray drying of a PSS-PEDOT aqueous solution, no conductive polymer solution was obtained.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A method for producing a conductive polymer solution comprising:

a freeze-drying step in which an aqueous conductive polymer solution containing a complex that includes a π-conjugated conductive polymer and a polyanion is freeze dried to thereby obtain a solid complex; and a dispersion step in which an organic solvent having a water content of 4% by mass or less and an amine compound are mixed to the solid complex, followed by a dispersion treatment.

2. The method for producing a conductive polymer solution according to claim 1, further comprising a step of mixing a binder resin which dissolves in an amount of 1 g or less in 100 g of water.

3. The method for producing a conductive polymer solution according to claim 2, wherein a water content of the solid complex is adjusted to within a range from 3 to 50% by mass in the freeze-drying step.

4. The method for producing a conductive polymer solution according to claim 3, wherein a specific surface area of the solid complex is adjusted to within a range from 5 to 200 $m^2/g$ in the freeze-drying step.

5. The method for producing a conductive polymer solution according to claim 4, wherein the dispersion treatment is conducted so that a cumulant average particle size of the complex is 2,000 nm or less in the dispersion step.

6. The method for producing a conductive polymer solution according to claim 3, wherein the dispersion treatment is conducted so that a cumulant average particle size of the complex is 2,000 nm or less in the dispersion step.

7. The method for producing a conductive polymer solution according to claim 2, wherein a specific surface area of the solid complex is adjusted to within a range from 5 to 200 $m^2/g$ in the freeze-drying step.

8. The method for producing a conductive polymer solution according to claim 7, wherein the dispersion treatment is conducted so that a cumulant average particle size of the complex is 2,000 nm or less in the dispersion step.

9. The method for producing a conductive polymer solution according to claim 2, wherein the dispersion treatment is conducted so that a cumulant average particle size of the complex is 2,000 nm or less in the dispersion step.

10. The method for producing a conductive polymer solution according to claim 1, wherein a water content of the solid complex is adjusted to within a range from 3 to 50% by mass in the freeze-drying step.

11. The method for producing a conductive polymer solution according to claim 10, wherein a specific surface area of the solid complex is adjusted to within a range from 5 to 200 $m^2/g$ in the freeze-drying step.

12. The method for producing a conductive polymer solution according to claim 11, wherein the dispersion treatment is conducted so that a cumulant average particle size of the complex is 2,000 nm or less in the dispersion step.

13. The method for producing a conductive polymer solution according to claim 10, wherein the dispersion treatment is conducted so that a cumulant average particle size of the complex is 2,000 nm or less in the dispersion step.

14. The method for producing a conductive polymer solution according to claim 1, wherein a specific surface area of the solid complex is adjusted to within a range from 5 to 200 $m^2/g$ in the freeze-drying step.

15. The method for producing a conductive polymer solution according to claim 14, wherein the dispersion treatment is conducted so that a cumulant average particle size of the complex is 2,000 nm or less in the dispersion step.

16. The method for producing a conductive polymer solution according to claim 1, wherein the dispersion treatment is conducted so that a cumulant average particle size of the complex is 2,000 nm or less in the dispersion step.

17. The method for producing a conductive polymer solution according to claim 1, wherein the aqueous conductive polymer solution includes at least one conductivity improver selected from the following compounds (a) to (h):

(a) a nitrogen-containing aromatic heterocyclic compound;

(b) a compound containing two or more hydroxy groups;

(c) a compound containing two or more carboxy groups;

(d) a compound containing one or more hydroxy groups and one or more carboxy groups;

(e) a compound containing an amide group;

(f) a compound containing an imide group;

(g) a lactam compound; and (h) a compound containing a glycidyl group.

* * * * *